(12) United States Patent
Hyatt et al.

(10) Patent No.: US 6,605,249 B2
(45) Date of Patent: Aug. 12, 2003

(54) CERAMIC GUIDE BLOCK AND METHOD OF MANUFACTURE

(76) Inventors: Clifford D. Hyatt, 155 Colonial Dr., Auburn, CA (US) 95603; Nicholas Osa, 4708 Auburn Folsom Rd., Loomis, CA (US) 95650

( * ) Notice: Subject to any disclaimer, the term of this patent is extended or adjusted under 35 U.S.C. 154(b) by 25 days.

(21) Appl. No.: 09/818,019

(22) Filed: Mar. 26, 2001

(65) Prior Publication Data

US 2001/0047710 A1 Dec. 6, 2001

Related U.S. Application Data

(60) Provisional application No. 60/192,638, filed on Mar. 27, 2000.

(51) Int. Cl.$^7$ ............................ B27B 13/10; C04B 33/32
(52) U.S. Cl. ......................... 264/667; 264/678; 264/681; 83/820
(58) Field of Search ................................ 264/655, 678, 264/667, 681

(56) References Cited

U.S. PATENT DOCUMENTS

| | | | |
|---|---|---|---|
| 2,525,324 A | * | 10/1950 | Twells |
| 4,665,617 A | | 5/1987 | Maier |
| 4,848,200 A | | 7/1989 | McGehee |
| 5,286,323 A | * | 2/1994 | Bagley |
| 5,490,854 A | | 2/1996 | Fisher |
| 5,730,928 A | * | 3/1998 | Ghosh et al. ............... 264/678 |

FOREIGN PATENT DOCUMENTS

| | | |
|---|---|---|
| CA | 1289040 | 9/1991 |
| GB | 2 232 411 A | 12/1990 |

* cited by examiner

*Primary Examiner*—James Derrington
(74) *Attorney, Agent, or Firm*—Heisler & Associates

(57) ABSTRACT

A guide block is provided for supporting a blade within a saw, such as a band saw, the guide block being formed from a ceramic material. A ceramic material is provided in powder form initially and is pressed into a billet of compressed ceramic powder. This billet of compressed ceramic powder is machined into a desired shape for the guide block but oversized in all of its dimensions by an oversized percent similar to an amount of shrinkage experienced by that ceramic material upon firing into a final hardened state. The machined compressed powder billet forms a pre-firing guide block which is fired at sufficient temperature and for sufficient duration so that it achieves its final hardened state as a ceramic guide block having dimensions precisely matching those of a prior non-ceramic guide block being replaced. The ceramic guide block can then be substituted into the saw for use in supporting the saw blade.

1 Claim, 3 Drawing Sheets

CERAMIC GUIDE BLOCK AND METHOD OF MANUFACTURE

CROSS-REFERENCE TO RELATED APPLICATIONS

This application claims benefit under Title 35, United States Code §119(e) of U.S. Provisional Application No. 60/192,638 filed Mar. 27, 2000.

FIELD OF THE INVENTION

The following invention relates to guide blocks for use in supporting saw blades and particularly band saw blades to prevent undesirable lateral motion of the saw blade. More specifically, this invention relates to methods for manufacturing saw blade guide blocks out of ceramic materials for replacements of non-ceramic saw blade guide blocks.

BACKGROUND OF THE INVENTION

Band saws and other related saws have an elongate blade with teeth on at least one edge and with lateral sides spaced apart by a thickness of the blade. The band saw moves in the direction in which the elongate blade extends so that the teeth on the edge of the blade can impact material being cut and form a cut in the material. The blade must be thin so that the cut can be thin and still not bind against the saw. The blade's thinness makes the blade susceptible to bending out of position laterally. To prevent such bending of the blade, guide blocks are provided adjacent to each of the lateral surfaces of the blade. These guide blocks abut directly against the lateral surfaces of the blade and keep the blade precisely aligned in the desired position.

Because the guide blocks are stationary and the blade is moving, the guide blocks typically experience a great amount of wear. While the guide blocks can be tightened so that they can continue to perform even after wearing somewhat, the guide blocks must eventually be replaced.

Guide blocks benefit from having high strength as well as low friction surfaces. Additionally, guide blocks benefit from experiencing minimal distortion when heated by the friction associated with abutting against the moving blade and benefit from resistance to heat related breakdown.

While ceramic materials have desireable strength, friction and thermal expansion/thermal strength characteristics, ceramics have not been utilized as guide blocks for a variety of reasons. First, ceramic materials in their hardened state are extremely difficult to machine. While they can be ground somewhat, grinding of such guide blocks is time consuming and expensive. Additionally, the hardness of the ceramics makes them susceptible to fracture during the grinding procedure. While ceramics can be formed to the desired size, such forming techniques are difficult because of the drastic dimensional changes which ceramics undergo when they are fired and transformed from an initial easily machined state to a final hardened state.

Accordingly, a need exists for a method of manufacturing guide blocks from ceramic materials which can simply and reliably form hardened ceramic materials in the precise shape necessary to function as guide blocks within a band saw or other saw blade supporting environment.

SUMMARY OF THE INVENTION

The following steps are typically involved in forming a saw blade guide block from ceramic materials according to this invention. Initially, a non-ceramic guide block to be replaced is identified. This prior guide block has a geometry, including a size and shape, which are to be precisely matched by this ceramic guide block replacement so that the ceramic guide block can fit within the guide block support structure provided by the band saw or other machine for supporting the prior guide block being replaced. A ceramic powder is selected and compressed into a billet having dimensions which are oversized relative to the geometry of the prior guide block being replaced. The ceramic powder is preferably compressed sufficiently so that it binds together into a solid mass which has not yet been fired and so does not have its final hardness, but which does have sufficient structural cohesiveness to allow it to be machined utilizing typical machining techniques such as shaping by a milling machine.

The billet of ceramic material is then milled to a shape which is similar to that of the prior guide block but with a size that is larger than the prior guide block being replaced. Specifically, the dimensions of the billet after machining must be oversized an amount precisely equal to an amount of shrinkage experienced by the ceramic material when fired into its final hardened form.

The oversized properly shaped billet of ceramic material is then heated such as at a temperature of at least 1500° F. and for a sufficient time so that the ceramic material can be completely fused together into a solid hardened mass of the ceramic material. When the billet is returned to room temperature, it shrinks down to the dimensions matching that of the prior guide block being replaced. A ceramic guide block is thus provided which can replace the prior guide block within the machine in which the prior guide block was configured for use.

OBJECTS OF THE INVENTION

Accordingly, a primary object of the present invention is to provide a guide block for totaling supporting a blade within a machine.

Another object of the present invention is to provide a method for manufacturing a saw blade guide block from ceramic material.

Another object of the present invention is to provide a ceramic guide block which can replace a non-ceramic guide block in a saw.

Another object of the present invention is to provide a method for manufacturing a ceramic guide block which does not require grinding other machining procedures on the hardened ceramic material and otherwise is easy to perform.

Another object of the present invention is to provide ceramic guide blocks which last longer than non-ceramic guide blocks.

Another object of the present invention is to provide a method for forming a ceramic material into a guide block of appropriate size to replace a prior non-ceramic guide block of known dimensions.

Another object of the present invention is to provide a guide block with high strength, high hardness, low thermal distortion and low friction surfaces, such that the guide block has good performance and long life.

In addition to the above objects, various other objects of this invention will be apparent from a careful reading of this specification including the detailed description contained herein below.

BRIEF DESCRIPTION OF THE DRAWING FIGURES

DETAILED DESCRIPTION OF THE PREFERRED EMBODIMENT

Figure 1:
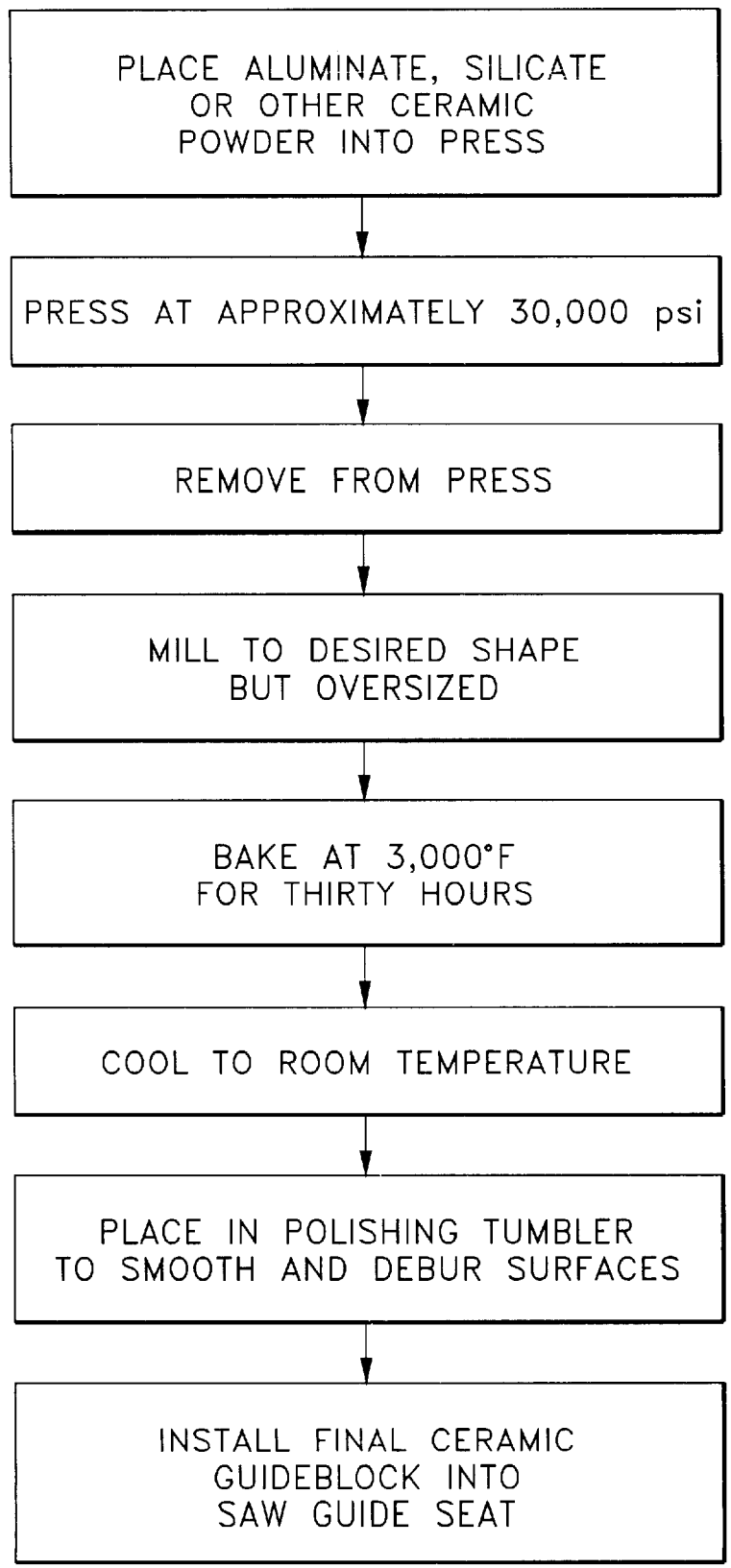
FIG. 1 is a block diagram identifying the steps involved in the method of this invention.

Referring to the drawings, wherein like reference numerals represent like parts throughout this disclosure, reference numeral 10 is directed to a ceramic guide block formed by the method of this invention. With the method of this invention a ceramic powder 20 is transformed into the ceramic guide block 10 of a size and shape precisely matching that desired for the ceramic guide block 10 so that it can replace a prior guide block of non-ceramic material. A saw which utilizes guide blocks to support the saw blade can thus be retrofitted with ceramic guide blocks 10 to enhance the performance of the saw.

Figure 2:
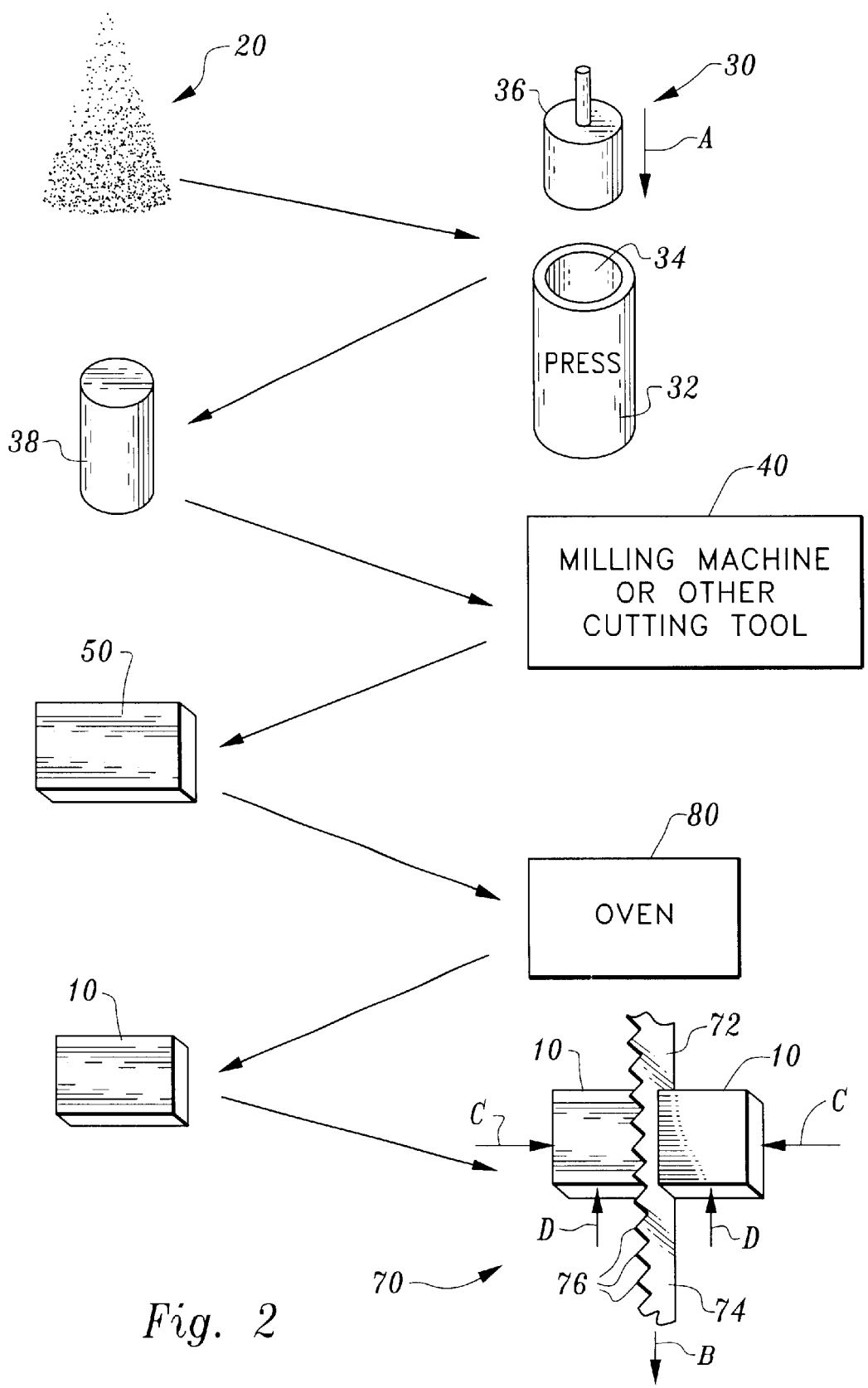
FIG. 2 is a schematic graphically depicting the transformation of the ceramic material from a powder into a finished ceramic guide block and illustrating its use within a saw.

In essence, and with particular reference to FIGS. 1 and 2, the basic method of this invention is identified. Initially, an appropriate ceramic powder 20 is placed within a press 30 where sufficient pressure is applied so that the powder 20 is formed into a solid compressed powder billet 38. This billet 38 is then machined to have a shape and dimensions which match those of a prior guide block to be replaced, except that the dimensions are oversized an amount similar to an amount of shrinkage experienced by the pre-firing guide block 50 when the pre-firing guide block 50 is heated into a final hardened state. The pre-firing guide block 50 is then placed into the oven 60 where it is heated to a sufficient temperature for a sufficient period of time so that it is transformed into its final hardened state. After cooling, the ceramic guide block 10 has taken on its final form. The ceramic guide block 10 can be optionally deburred, such as by tumbling in a polishing device, so that the ceramic guide block 20 has sufficiently desirable low friction surfaces. The ceramic guide block 10 is then ready for installment within a saw 70 for supporting lateral side surfaces 74 of a blade 72 of the saw, such as a band saw 70.

More specifically, and with particular reference to FIGS. 1 and 2, the specific details of the steps involved in the ceramic guide block manufacturing method are described. Initially, a ceramic powder 20 is selected. This powder 20 is preferably alumina oxide. Other acceptable ceramic materials for use in the method of this invention include nitrides, silicates and oxides. Different types of ceramics can also be mixed together. Preferably, the ceramic material is at least 97.5% pure alumina oxide. The ceramic material could be made of other oxides such as zirconium oxide.

The powder 20 is placed within the press 30. The press 30 preferably includes a base 32 with a chamber 34 located therein and a ram 36 sized to fit within the chamber 34. Pressure is applied by driving the ram 36 into the chamber 34 (along arrow A of FIG. 2). Sufficient pressure is applied by the press 30 so that the powder 20 adheres together as a compressed powder billet 38. For some ceramic materials it may be necessary to include a binding agent within the powder 20 to assist the powder 20 in forming the billet 38 as desired. The billet 38 must be sufficiently strong to withstand forces applied by a milling machine or other cutting tool to shape the billet 38 into the desired geometry. The press 30 preferably exerts sufficient force on the powder 20 so that a pressure of 30,000 psi is obtained. At a minimum the press 30 must have sufficient pressure to cause the powder to adhere sufficiently together with or without a separate binder to allow it to be machined as discussed below.

Once the compressed powder billet 38 has been formed and removed from the press 30, the press 30 can then be reused with more powder 20 for forming additional compressed powder billets 38.

While it is conceivable that the chamber 34 within the press 30 could be provided with the desired geometry for a pre-firing guide block 50, preferably the compressed powder billet 38 is processed by a milling machine 40 to take on the appropriate geometry, including the appropriate shape and size so that the pre-firing guide block 50 will eventually have a size and shape matching that of a prior guide block to be replaced.

Specifically, the milling machine 40 or other cutting tool would typically utilize known milling techniques to shape the billet 38 into a shape which matches the shape of the prior guide block to be replaced. However, the size of the billet 38 after being machined into the pre-firing guide block 50 would be larger than the size of the prior guide block to be replaced. The oversized nature of the pre-firing guide block 50 is carefully calculated to match an amount of contraction which the pre-firing guide block 50 will encounter when fired into its final hardened state. Different ceramic materials may have different amounts of shrinkage which are experienced. Also, a level of compaction achieved in the press may vary with different materials and different press applying pressures. Hence, the amount of oversizing of the pre-firing guide block 50 will vary. The range of oversize percent for all ceramics is generally between 15% and 25%. For alumina oxide ceramics pressed at about 30,000 psi, the range of oversize percent is between 17% and 19%. With an oversize percent of 18% considered most accurately reflective of alumina oxide ceramic material compressed at 30,000 psi.

If an oversize percent is unknown for a material and/or compression pressure, it can be determined as follows. A known material is compressed to a known pressure and machined to known pre-firing dimensions. The pre-firing test billet is then fired at the desired temperature for a desired time. The material is then measured post firing. A variance between the pre-firing and post firing dimensions over the pre-firing dimensions defines the oversize percent for that material.

The pre-firing guide block 50 is then placed into a high temperature oven 60, typically along with a plurality of other pre-firing guide blocks 50 for simultaneous firing into a final hardened state as ceramic guide blocks 10. Preferably, the temperature maintained with the oven 60 is 3,000° F. At a minimum, the temperature must be sufficient to cause the pre-firing guide block 50 to harden into its post-firing state. The oven 60 can have a higher temperature so long as the melting point for the ceramic material is not exceeded. Preferably, the oven 60 maintains this desired temperature for a duration of at least thirty hours.

After the oven 60 has maintained the desired temperature for the desired time duration, the ceramic material within the oven is allowed to cool so that the pre-firing guide blocks 50 have been fully transformed into final hardened ceramic guide blocks 10. These final hardened ceramic guide blocks 10 have a size and shape precisely matching that of the prior non-ceramic guide blocks being replaced. The ceramic guide blocks 10 can thus be utilized within the band saw 70 or similar saw precisely in the fashion that the prior non-ceramic guide blocks are used.

Specifically, typically a pair of the ceramic guide blocks 10 would be located on opposite sides of a blade 72 within a band saw 70 so that each ceramic guide block 10 abuts one of the side surfaces 74 of the band saw 70. The blade 72 is then caused to move, along arrow B of FIG. 2, and the teeth 76 of the blade 72 allowed to cut a material. A guide block support structure provides force, along arrow D of FIG. 2 to maintain the position of the ceramic guide block 10. Additionally, force can be supplied laterally to keep the ceramic guide blocks 10 from being displaced laterally away from the side surfaces 74 of the band saw 70.

Figure 3:
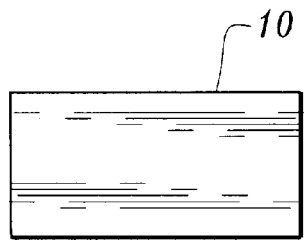
FIGS. 3–10 illustrate front and side elevation views of guide blocks having various different sizes and shapes as examples of the guide block geometries achieved by the method of this invention.
Figure 4:
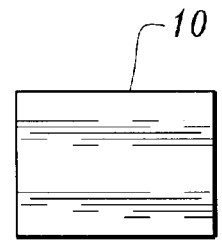
Figure 5:
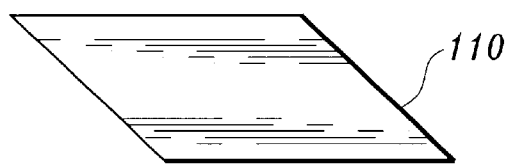
Figure 6:
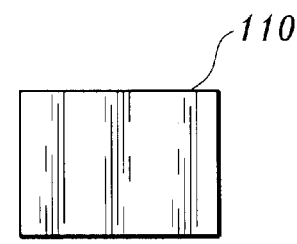
Figure 7:
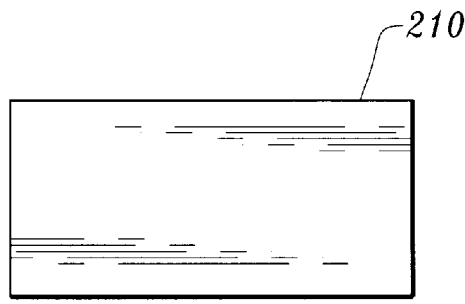
Figure 8:
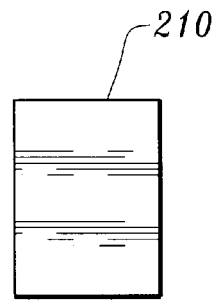
Figure 9:
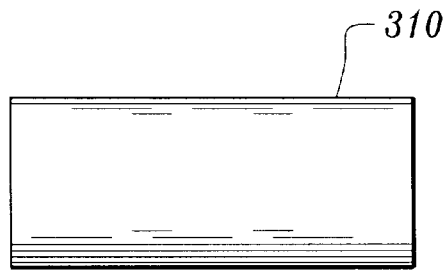
Figure 10:
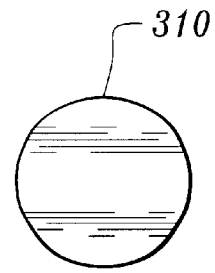

With particular reference to FIGS. 3–10, shapes of ceramic guide blocks are shown. These shapes are illustrative of those which can work as ceramic guide blocks for supporting a saw blade, but do not illustrate every conceivable geometry available. FIGS. 3 and 4 show a short generally rectangular guide block 10. FIGS. 5 and 6 illustrate a guide block 110 which has a skewed parallelogram form. FIGS. 7 and 8 show a guide block 210 with an elongated rectangular form. FIGS. 9 and 10 show a cylindrical guide block 310.

EXAMPLE 1

One common rectangular prior guide block utilized in a band saw provided by the Jet Machinery company of Auburn, Wash. has a height of ½ inches, a length of ¾ inches and a width of ½ inches. To form a ceramic guide block 10 with these final dimensions, a pre-firing guide block 50 is machined from a compressed powder billet 38 formed of alumina oxide powder 20. The alumina oxide is preferably $Al_2O_3$ with three oxygen atoms for every two aluminum atoms. Other alumina oxide formulations or mixtures of different formulations can also be used. The pre-firing guide block 50 has dimensions of ½ inches height plus 18%, ¾ inches length plus 18%, ½ inches thickness plus 18% after compression. The pre-firing guide block 50 is heated to 3,000° F. for thirty hours and then cooled to room temperature. The ceramic guide block 10 then has dimensions of ¾ inches length, ½ inches width, ½ inches thickness which precisely match those of the prior guide block being replaced by the ceramic guide block 10.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:
1. A method for manufacturing saw blade guide blocks from ceramic material, including the steps of:

identifying a desired guide block size and shape to fit the guide block on a saw in a position supporting a saw blade;

compressing a ceramic powder into a billet having dimensions sufficiently large to encompass a volume similar in shape to the desired guide block but larger in size than the desired guide block, the ceramic powder being of a type which shrinks when the ceramic powder is heated;

milling the billet to a shape similar to that of the desired guide block but larger in size than the desired guide block;

heating the billet;

returning the billet to room temperature with the billet transformed into a ceramic guide block of the desired guide block size and shape;

wherein said compressing step includes compressing the ceramic powder sufficiently that the powder can adhere together as a solid unitary mass without fracture during said milling step;

wherein said compressing step includes compressing the ceramic powder to at least about 30,000 pounds per square inch;

wherein said heating step includes heating the billet to at least about 3,000° F.;

wherein said heating step includes the step of continuing to heat the billet for at least thirty hours;

wherein the larger size of the billet after said milling step over the size of the desired guide block is eighteen percent;

wherein said heating step includes heating the billet to a sufficient temperature to cause the billet to harden into a post-firing state which is shrunk relative to a size of the billet before said heating step;

including the further step of deburring edges and corners of the ceramic guide block;

wherein said milling step includes the step of milling the billet into an elongated rectangular form; and wherein the ceramic powder of said compressing step is at least 97.5 percent pure alumina oxide.

* * * * *